United States Patent [19]

Takano et al.

[11] 4,050,076

[45] Sept. 20, 1977

[54] DEFLECTION MEANS INCLUDING A DEFLECTION ELECTRODE MOUNTED ON A TRAVELLING CARRIAGE IN AN INK JET SYSTEM PRINTER

[75] Inventors: Rikuo Takano, Musashino; Tamaki Saito, Koganei; Yuji Sumitomo, Nara; Toshio Kobayashi, Osaka; Yoichi Yamamoto, Nara; Fumio Siozaki; Tokio Maezawa, both of Yamatokoriyama, all of Japan

[73] Assignees: Nippon Telegraph and Telephone Public Corporation; Sharp Kabushiki Kaisha, both of Musashino, Japan

[21] Appl. No.: 715,007

[22] Filed: Aug. 17, 1976

[30] Foreign Application Priority Data

Aug. 18, 1975 Japan ............................... 50-100370

[51] Int. Cl.2 ............................................ G01D 15/18

[52] U.S. Cl. ...................................................... 346/75

[58] Field of Search .......................................... 346/75

[56] References Cited

U.S. PATENT DOCUMENTS

| | | | |
|---|---|---|---|
| 3,562,761 | 2/1971 | Stone et al. | 346/75 |
| 3,938,163 | 2/1976 | Fujimoto et al. | 346/75 |
| 3,969,733 | 7/1976 | DeMoss et al. | 346/75 X |

*Primary Examiner*—George H. Miller, Jr.
*Attorney, Agent, or Firm*—Birch, Stewart, Kolasch & Birch

[57] ABSTRACT

A plate shaped slim electrode is mounted on a carriage which supports an ink issuing unit and a charging tunnel, and is driven to travel in the lateral direction. A cylinder shaped rotary deflection electrode is rotatably mounted on the body of an ink jet system printer in a direction parallel to the travelling direction of the carriage. In a preferred form, a slit opening is formed in the center of the plate shaped slim electrode. The plate shaped slim electrode is maintained at the ground potential, whereas the rotary deflection electrode is connected to a high voltage source to establish a high voltage electric field between the plate shaped slim electrode and the rotary deflection electrode.

10 Claims, 5 Drawing Figures

FIG. 1
PRIOR ART
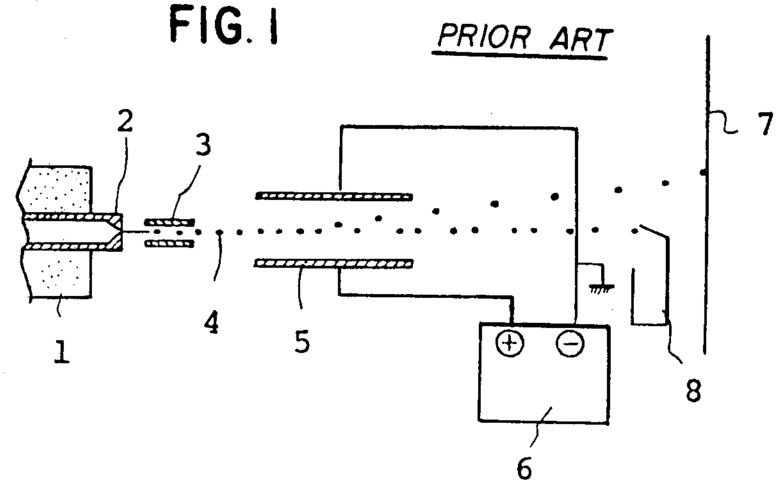
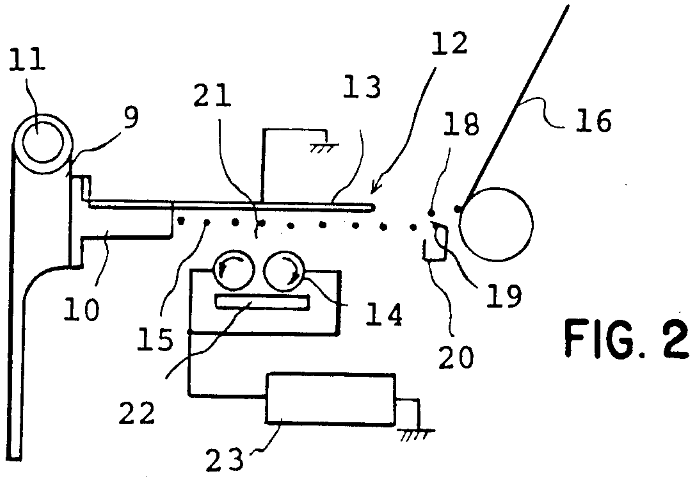
FIG. 2
FIG. 3
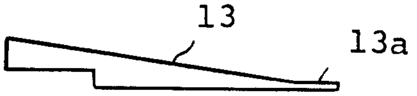
FIG. 4
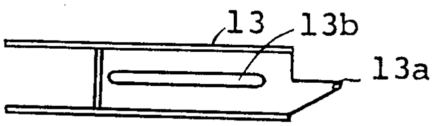

DEFLECTION MEANS INCLUDING A DEFLECTION ELECTRODE MOUNTED ON A TRAVELLING CARRIAGE IN AN INK JET SYSTEM PRINTER

BACKGROUND OF THE INVENTION

The present invention relates to an ink jet system printer of the charge amplitude controlling type and, more particularly, to an improvement on a deflection means in an ink jet system printer.

Undesirable dust such as thread drifting in the air will be captured in a deflection section in an ink jet system printer because of a high voltage electric field established by deflection electrodes. This causes printing distortion since non-uniformity will be created in the electric field by the dust captured in the deflection section and/or travelling ink droplets emitted from a nozzle will come into collision with the dust captured in the deflection section.

When the ink droplets impinge upon a recording paper at very high speeds, ink fog is unavoidably diffused in various directions. The ink fog bears the same charge as the ink droplet from which it originates and, therefore, the ink fog tends to be attracted toward one of the deflection electrodes which is biased with opposite polarities from the ink fog. Hence, the ink fog becomes attached to the deflection electrode, which may cause the system to operate erroneously or break down, since the insulation of the system can not be maintained.

In the conventional plate shaped deflection electrodes, the above-mentioned dust captured in the deflection section and the ink fog attached to the deflection electrodes could not be removed, since the conventional deflection plates are stationary fixed to the system of the printer. Moreover, a large number of dust will be captured in the deflection section of the conventional system, because the deflection plates are provided to extend across the whole printing region in the conventional system.

OBJECTS AND SUMMARY OF THE INVENTION

Accordingly, an object of the present invention is to provide an ink jet system printer of the charge amplitude controlling type which can minimize printing distortion and an erroneous operation.

Another object of the present invention is to improve deflection means in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a plate shaped slim electrode is mounted on a carriage which carries an ink issuance unit and a charging tunnel, and is driven to travel in the lateral direction. A cylinder shaped rotary deflection electrode is rotatably mounted on the body of the ink jet system printer in a direction parallel to the travelling direction of the carriage. The plate shaped slim electrode is maintained at the ground potential, and the rotary deflection electrode is connected to a high voltage source to establish a high voltage electric field between the plate shaped slim electrode and the rotary deflection electrode.

In a preferred form, a slit opening is formed in the center of the plate shaped slim electrode, under which ink droplets travel. A projection is formed at the end of the plate shaped slim electrode, thereby to facilitate the recognition of the printing position. A cleaning means is installed close to the rotary deflection electrode at the position where the electric field established between the rotary deflection electrode and the plate shaped slim electrode will not be disturbed by the cleaning means in order to brush off the rotary deflection electrode as it rotates.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a schematic sectional view of an ink jet system printer of the charge amplitude controlling type of the prior art;

FIG. 2 is a schematic sectional view of an ink jet system printer of the charge amplitude controlling type employing an embodiment of a deflection means of the present invention;

FIG. 3 is a side view of an embodiment of a plate shaped slim electrode employed in the deflection means of FIG. 2;

FIG. 4 is a plan view of the plate shaped slim electrode of FIG. 3; and

DESCRIPTION OF THE PREFERRED EMBODIMENTS

Figure 5:
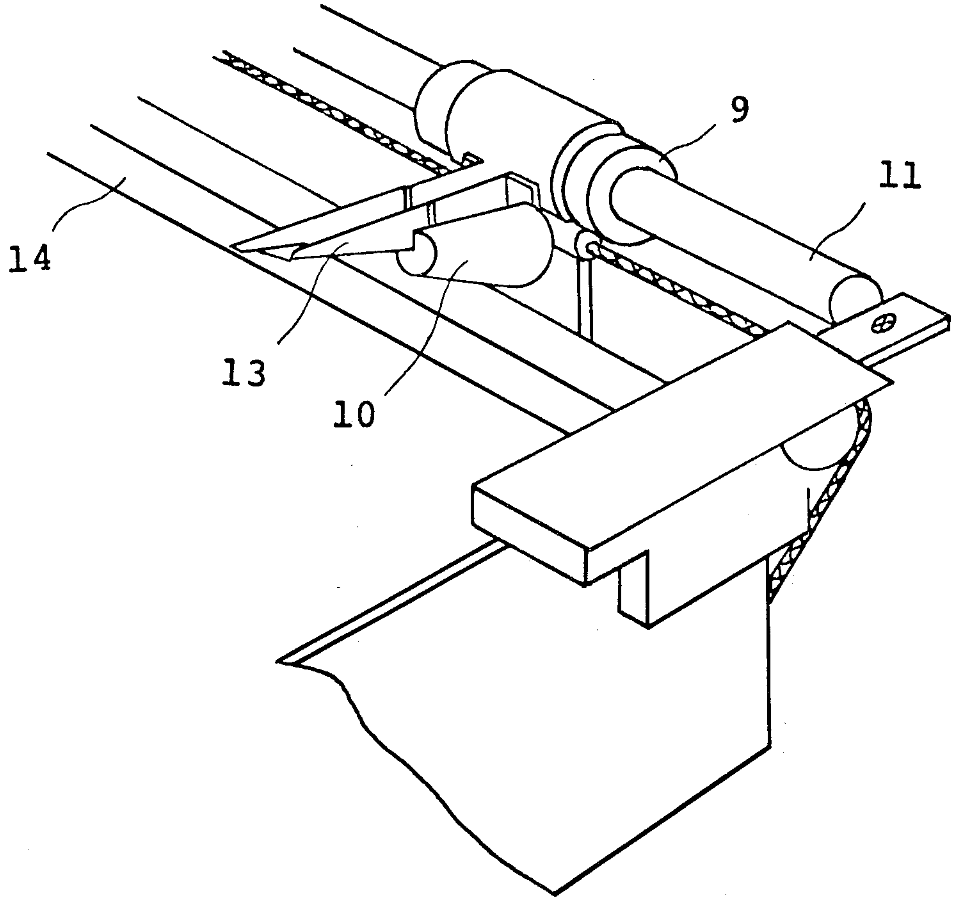
FIG. 5 is a perspective view of an essential part of the ink jet system printer of FIG. 2.

Referring now in detail to the drawings, and to facilitate a more complete understanding of the present invention, an ink jet system printer of the charge amplitude controlling type and deflection electrodes of the prior art will be first described with reference to FIG. 1.

In general, an ink jet system printer of the charge amplitude controlling type is constructed as shown in FIG. 1. Ink liquid is sent under pressure to a nozzle 2 through an ink liquid supply system. The nozzle 2 is held by an ink droplet issuance unit including an ultrasonic vibrator 1. The ink liquid issuing from the nozzle 2 is excited by the ultrasonic vibrator 1 so that ink droplets 4 of a uniform mass and of a frequency equal to the exciting signal frequency are formed.

The individual ink droplets 4 are charged in response to printing information to selected amplitudes with the use of a charging tunnel 3 in a known manner, and are deflected in accordance with the amplitude of charges on the droplets as they pass through a high-voltage electric field established by a pair of deflection plates 5, to which a high-voltage source 6 is connected. Thus deflected ink droplets are then deposited on a recording paper 7 in order to record desired symbols in a dot matrix pattern. Ink droplets, not contributive to writing operation, travel in a rectilinear direction or are deflected in the opposite direction to the writing droplets. Hence, the ink droplets, not contributive to writing operation, are not deposited on the recording paper 7, but are directed to a beam gutter 8 in order to recirculate waste ink liquid to the ink liquid supply system.

The deflection plates 5 are, in general, stationarily fixed to the ink jet system printer in such a manner to extend across the whole printing region of the system printer. When undesirable dust such as thread drifting in the air comes near the deflection plates 5, the dust will be attracted toward the deflection plates 5 and attached to the deflection plates 5 to stand along the electrical force line established between the deflection plates 5.

Thus captured dust will disturb the electric field established between the deflection plates 5. Moreover, the ink droplets 4 will come into collision with the captured dust, which will result in the printing distortion.

FIG. 2 schematically shows an ink jet system printer employing an embodiment of a deflection means of the present invention.

A carriage 9 is slidably mounted on a shaft 11 and driven to travel in the direction perpendicular to the drawing sheet of FIG. 2. The carriage 9 carries a printing head 10 which includes the nozzle 2, the ultrasonic vibrator 1 and the charging tunnel 3 shown in FIG. 1. Writing ink droplets 18 are charged in response to printing information to selected amplitudes, and are deflected in accordance with the amplitude of charges on the droplets as they pass through a deflection means 12. Thus deflected ink droplets 18 are then deposited on a recording paper 16 in order to record desired symbols in a dot matrix pattern. Ink droplets 19, not contributing to writing operation, are directed to a beam gutter 20 in order to recirculate waste ink liquid to an ink liquid supply system (not shown).

The deflection means 12 comprises a plate shaped slim electrode 13 and cylinder shaped rotary deflection electrodes 14. The plate shaped slim electrode 13 is mounted on the carriage 9 and is maintained at the ground potential. At the center of the plate shaped slim electrode 13, a slit opening **13*b* is formed as shown in FIG. 4, whereby there is little possibility that the undesirable dust will be captured in the course of travelling ink droplets 15. A projection 13*a* is formed at the end of the plate shaped slim electrode 13 as shown in FIGS. 3 and 4**, thereby to facilitate the recognition of the printing position.

The cylinder shaped rotary deflection electrodes 14 are connected to a high-voltage source 23 to establish a high-voltage electric field between the plate shaped slim electrode 13 and the rotary deflection electrodes 14. The rotary deflection electrodes 14 are provided in such a manner to extend across the whole printing region and are driven to rotate in the directions shown by arrows in FIG. 2. A cleaning pad 22 made of, for example, chamois is installed close to the rotary deflection electrodes 14 at the position where the electric field established between the plate shaped slim electrode 13 and the rotary deflection electrodes 14 will not be disturbed by the cleaning pad 22. The undesirable dust attached to the rotary deflection electrodes 14 will be removed by the cleaning pad 22 as the rotary deflection electrodes 14 rotate.

FIG. 5 schematically shows a driving system of the carriage 9 carrying the printing head 10 and the plate shaped slim electrode 13.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer of the charge amplitude controlling type which emits charged ink droplets from a printing head toward a record receiving member, said system comprising a stationary body and a carriage, said printing head being carried by a carriage travelling in the lateral direction across the body, means for selectively deflecting said ink droplets by deflection means, and recording desired symbols on said record receiving member with said selectively deflected ink droplets, the deflection means comprising:

a plate shaped slim electrode mounted on the carriage;

a counter electrode mounted on a fixed support means with respect to the body of the ink jet system printer; and a high-voltage source to establish a high-voltage electric field between the plate shaped slim electrode mounted on the carriage and the counter electrode mounted on the body of the ink jet system printer.

2. The combination of claim 1, wherein the printing head includes a nozzle for emitting the ink droplets, an ultrasonic vibrator attached to the nozzle for exciting the nozzle at a given frequency, and a charging tunnel for charging the ink droplets in accordance with printing information.

3. The combination of claim 1, wherein the plate shaped slim electrode is maintained at the ground potential, and the counter electrode is connected to the high-voltage source.

4. The combination of claim 1, wherein a slit opening is formed in the center of the plate shaped slim electrode mounted on the carriage.

5. The combination of claim 1, wherein a projection is formed at the end of the plate shaped slim electrode mounted on the carriage.

6. The combination of claim 1, wherein the counter electrode is a rotary electrode rotatably mounted on the body of the ink jet system printer about said fixed support means.

7. The combination of claim 6, wherein the rotary electrode is cylinder shaped and driven to rotate.

8. The combination of claim 7, wherein the cylinder shaped rotary electrode is installed in such a manner to parallel the carriage travelling direction and to extend across the printing region of the system printer.

9. The combination of claim 6, which further comprises a cleaning means installed close to the rotary electrode in order to clean the rotary electrode as it rotates.

10. The combination of claim 9, wherein the cleaning means is provided at the position where the high-voltage electric field established between the plate shaped slim electrode and the rotary electrode will not be disturbed by the cleaning means.

* * * * *